US008768977B2

(12) United States Patent
Golab et al.

(10) Patent No.: US 8,768,977 B2
(45) Date of Patent: Jul. 1, 2014

(54) DATA MANAGEMENT USING WRITEABLE SNAPSHOTS IN MULTI-VERSIONED DISTRIBUTED B-TREES

(75) Inventors: Wojciech Golab, Mountain View, CA (US); Mehul A. Shah, Saratoga, CA (US); Benjamin Albert Sowell, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 13/562,941

(22) Filed: Jul. 31, 2012

(65) Prior Publication Data

US 2014/0040199 A1 Feb. 6, 2014

(51) Int. Cl.
*G06F 17/30* (2006.01)

(52) U.S. Cl.
USPC .......................................... 707/806; 707/797

(58) Field of Classification Search
USPC .................................................. 707/797, 806
See application file for complete search history.

(56) References Cited

U.S. PATENT DOCUMENTS

| 7,389,394 | B1 | 6/2008 | Karr et al. |
| 7,650,533 | B1 | 1/2010 | Saxena et al. |
| 2005/0050110 | A1* | 3/2005 | Sawdon et al. ............... 707/201 |
| 2006/0053139 | A1 | 3/2006 | Marzinski et al. |
| 2008/0104141 | A1* | 5/2008 | McMahon ................... 707/203 |
| 2008/0183973 | A1 | 7/2008 | Aguilera et al. |
| 2009/0055607 | A1* | 2/2009 | Schack et al. ................ 711/162 |
| 2011/0161381 | A1 | 6/2011 | Wang et al. |
| 2013/0103644 | A1* | 4/2013 | Shoens ......................... 707/638 |

OTHER PUBLICATIONS

Gramsci, Shantanu Khan., "A Scalable Video Streaming Approach using Distributed B-Tree," (Research Paper), Apr. 2011, pp. 1-43, Shantanu Khan Gramsci, The University of British Columbia (Vancouver).

* cited by examiner

*Primary Examiner* — Khanh Pham

(57) ABSTRACT

A method for managing data using writeable snapshots in a multi-versioned, distributed B-tree comprising nodes distributed over a plurality of servers, includes receiving a transaction request specifying a transaction type, the transaction having a transaction snapshot id, and determining the transaction type. If the transaction type is an update transaction, the method includes determining a node to update, which is defined by a node snapshot id, and if the transaction snapshot id is greater that the node snapshot id, the method copies the node and updates the copy to create a writeable snapshot, assigns the transaction snapshot id as a node snapshot id of the copy, and places a pointer from the node to the copy.

15 Claims, 8 Drawing Sheets

DATA MANAGEMENT USING WRITEABLE SNAPSHOTS IN MULTI-VERSIONED DISTRIBUTED B-TREES

BACKGROUND

Any enterprise, but particularly a large enterprise, may accumulate significant quantities of data. From time to time, the enterprise may have a need to execute various transactions that access the accumulated data. The accumulated data may have a time-dimension that may play a role in the transaction. For example, a financial institution may want to determine the effects on a financial portfolio of varying investment strategies—in essence, asking the question, "what if investment strategy B was used rather than actually-used investment strategy A?" Such an analytics transaction, or query, may be difficult to execute efficiently, and without disrupting current data transactions. One way to enhance the efficiency of such a transaction is by implementing an efficient data management system.

A B-tree is a data structure that supports insertion, lookup, deletion, and other operations in such a manner that makes data access operations more efficient. A B-tree begins with a root node, progresses to one or more internal nodes, and ends with one or more leaf nodes. Each leaf and internal node may store a key. A key identifies a record (i.e., data). Intermediate nodes of the B-tree contain pointers to lower level nodes. A search for a particular key (record) performed with a B-tree starts with the root node, and the B-tree is traversed from root node to leaf nodes. Once a leaf node with a particular key is found, the record associated with the key can be retrieved. B-trees may be used with distributed storage and search systems.

DESCRIPTION OF THE DRAWINGS

The detailed description will refer to the following drawings in which like numerals refer to liked items, and in which.

DETAILED DESCRIPTION

Figure 1:
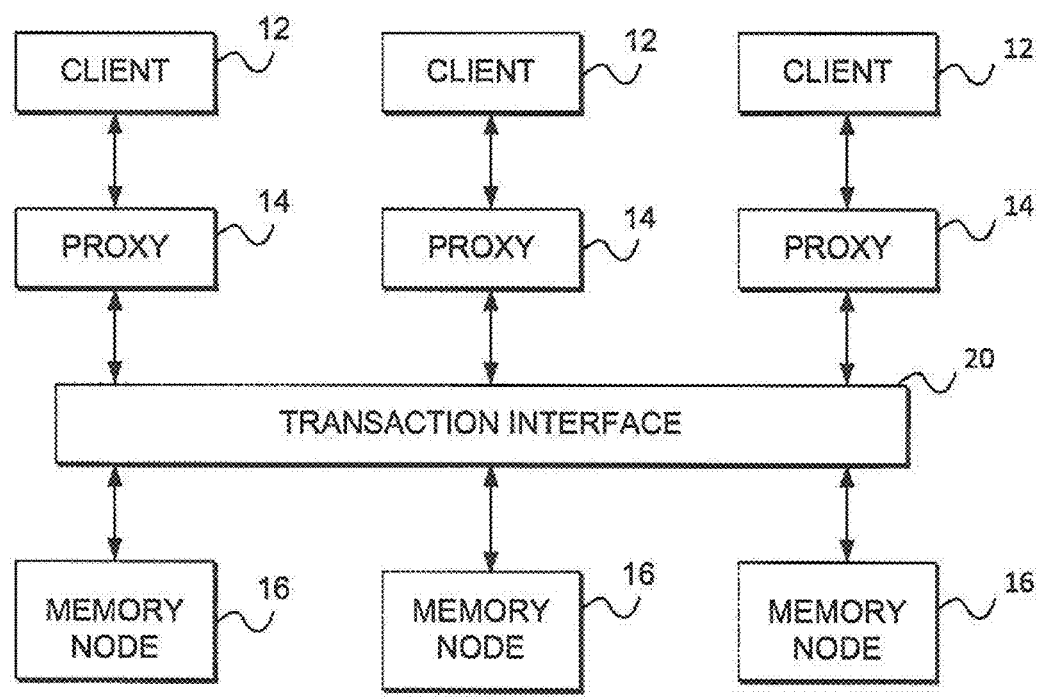
FIG. 1 illustrates an example of an architecture that supports multiple transaction types in an enterprise.

An enterprise can be any organization of people, facilities, functions, and data, for example. To maintain and manage its data, the enterprise may employ a multi-version database. In this multi-version database, initial, or old, versions of data may be replaced by subsequent, or new, versions of data. A database management system may not delete the old data versions, at least not initially. Rather, the database management system for a multi-version database may mark the old data as obsolete and then add a new version of the data. Thus, there are multiple versions of the data stored, but only one is the latest. This allows the database management system to avoid overhead of filling in holes in memory or disk structures but may require (generally) the system to periodically sweep through and delete the old, obsolete data versions.

A multi-version B-tree may be used to facilitate fast access to versioned data in a multi-version database. A B-tree is a data structure that keeps data sorted and allows searches, sequential access, insertions, and deletions in logarithmic time. A B-tree can be viewed as a scalable, main memory index that offers transactional access to stored data. The stored data may be distributed across a number of storage platforms or devices. The B-tree allows a search to quickly locate specific data items and permits fast enumerations of subsets of indexed data. B-trees are well suited for handling the operational data of an enterprise, such as financial quotes and portfolios for investment banks, electronic auctions, online gaming, shopping carts, etc. A distributed B-tree indexes data by harnessing together multiple servers. Such a B-tree may be classified as a fully persistent or partially persistent structure. Fully persistent structures support reads and writes to all versions of the data structure, while partially persistent structures supports reads of all versions, but writes only to the most recent version.

Such fast access to the database may be useful because the enterprise may, from time-to-time, desire to evaluate its data by executing transactions on the data. There may be at least two types of transactions. One may be an online transaction processing (OLTP) transaction, and a second may be an analytics transaction. An OLTP transaction generally is executed against a current version of the data. The OLTP transaction may be executed quickly (i.e., low latency) and may be repeated frequently. In addition, there may be many different OLTP transactions.

In contrast, the analytics transaction may be executed on older, or historical data, for example, by asking "what-if" questions related to historical versions of the data. There may be at least two types of analytics transactions. One type of analytics transaction may involve looking at a point-in-time view of the historical data. Another type of analytics transactions may involve looking at time-varying historical data—that is, looking at historical data as it changes over a month, a year, or a number of years, for example. The analytics transactions may be time-intensive and may have a high latency as compared to the OLTP transactions. The analytics transactions may be executed less frequently than the OLTP transactions. There may be many different OLTP transactions. However, execution of the OLTP transactions may be hindered by concurrent execution of the analytics transactions, and vice-versa.

To overcome these transactional conflicts, disclosed herein is a data management system, and corresponding method, that provides access to an enterprise's data in a way that makes both OLTP and analytics transactions efficient. In an embodiment, the system includes a mechanism to create and save in read-only format, "point-in-time" snapshots of the data. In some situations, the analytics transaction may involve analysis of data over time, and so the system and method may provide a mechanism to write and read historical data. In other words, the system and method may provide "writeable" snapshots. The enterprise's analytics queries then may be run on one or more of the snapshots. The enterprise's OLTP transactions, however, may be run on the current state of the data. In some instances, the current state of the data may correspond to that in a most recent snapshot.

Figure 7:
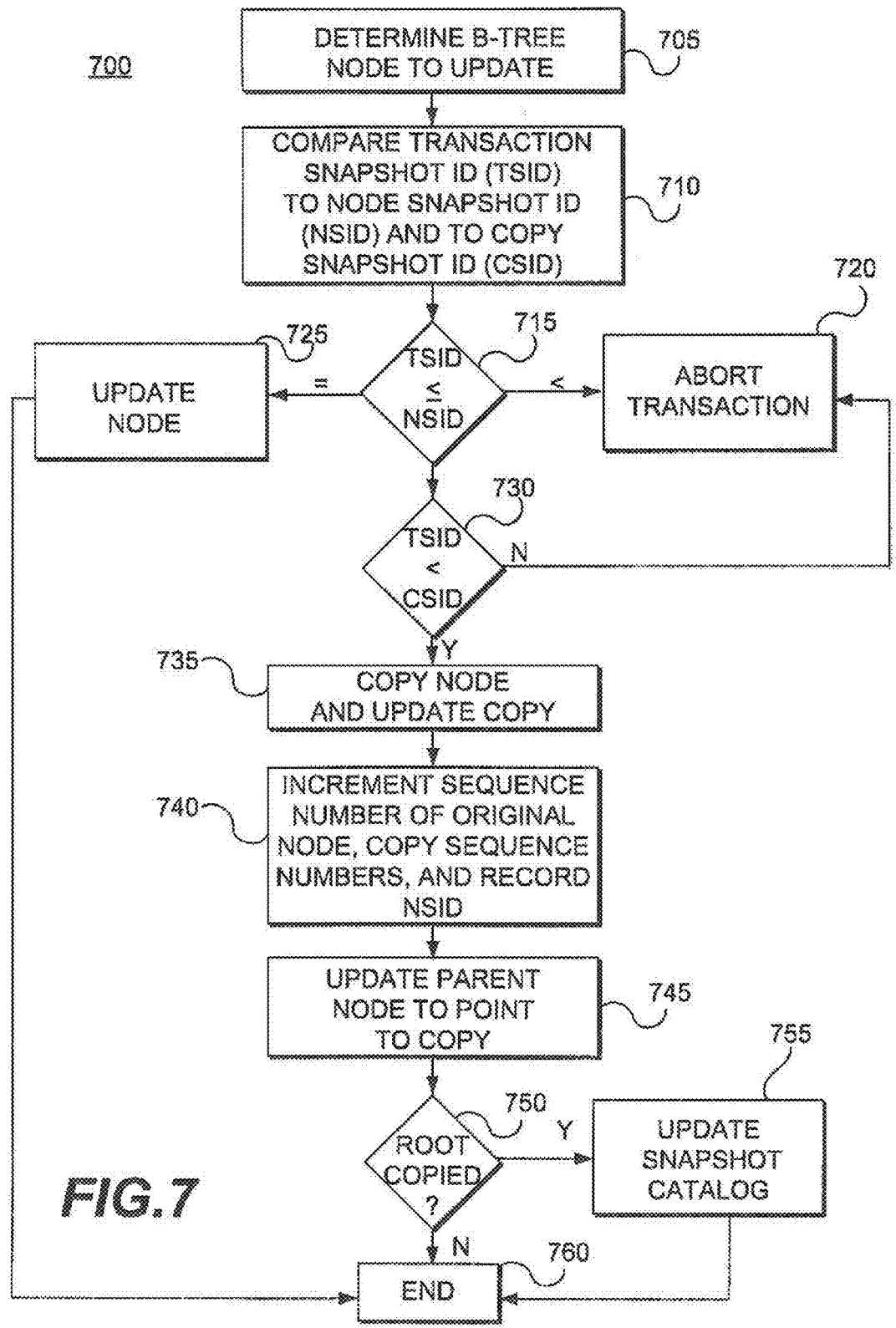

To further improve data access and transaction efficiency, the system may provide for execution of "mini-transactions." As used herein, a mini-transaction is an operation on a node or set of nodes of a larger B-tree. The set of B-tree nodes accessed by a mini-transaction is specified before the transaction begins executing. A mini-transaction may read, compare, and conditionally update data at multiple memory nodes running on different servers. The updates are applied atomically only if all comparisons evaluate positively, or there are no comparisons. FIG. 7 illustrates an example update that is applied only if all comparisons evaluate positively. If a comparison fails, the mini-transaction aborts. The nodes and the corresponding mini-transactions themselves may be distributed. That is, the mini-transactions may operate on data spread across multiple servers. In an example, in a distributed B-tree, each B-tree node may reside on one server, and the B-tree may be replicated for fault-tolerance.

One way to order and access the enterprise's data to allow analytics and OLTP transactions is by implementing a B-tree structure, and a corresponding supervisory layer, that allow clients of the enterprise to access the data according to which of the two transaction types are required. Note that as used herein, a client generally refers to a machine operated by a system administrator or other individual of the enterprise.

To optimize data transactions, the herein disclosed system organizes data in a scalable distributed B-tree, and exposes a key-value interface with support for range queries. The system is accessed through an architecture, such as the example architecture shown in FIG. 1, which supports multiple transaction types in an enterprise. In FIG. 1, architecture 10 includes clients 12, proxies 14, and memory nodes 16. The clients 12 may generate requests for transactions on the enterprise's data. The proxies 14 execute these transactions on behalf of clients 12 by accessing a state of the data, which may be stored at nodes 16 in the form of a B-tree. The memory nodes 16 store the state of the B-tree. The architecture 10 provides a transactional interface 20 that the proxies 14 use to implement more complex transactions, and then use the latter to execute B-tree operations. Components of the architecture 10 communicate using remote procedure calls and may be physically co-located or separated by a data center LAN, for example.

As noted above, large-scale databases may be implemented with data management features that allow ordered operations to be executed on the data stored therein. A database is ordered if there is an efficient way to navigate through the elements of the database according to some order with respect to a "key." A "key" refers to an attribute that may be used to sort or identify corresponding data records in the database.

A distributed B-tree may maintain sequence numbers for nodes in the B-tree. The sequence number of a node in the B-tree is updated whenever a change is made to the node. The use of sequence numbers allows a client accessing the distributed B-tree to efficiently determine whether the content of any node has changed since the last time the client accessed the node. Thus, sequence numbers are useful for maintaining consistency of the distributed B-tree such that multiple concurrent operations do not corrupt the internal organization of the distributed B-tree. Determining sequence numbers may employ a simple numbering scheme that increments each time data at a node is changed. Other schemes may include a timestamp reflecting a time of change, a hash of content of the node, or any other information or sequence of bits that change when the content of the node changes.

Data management systems that implement B-trees may not fully utilize the power and efficiency of a B-tree structure. For example, a B-tree based data management system may not provide for, or allow simultaneous, fast, and low-latency analytics queries, with a mix of transactions that may apply insertions and updates to the B-tree. Furthermore, data indexed by the B-tree may be stale or out-of-date, and the subsequent use of this stale data may lead to less than optimum analyses and evaluations.

As previously mentioned herein, to enhance the efficiency of transactions executed on the enterprise's data, the herein disclosed system and corresponding method allow for and provide multi-versioning of a transactional B-tree by using "writeable" snapshots, which are point-in-time views of data indexed by the B-tree. The snapshots allow an enterprise to simultaneously run both OLTP transactions and real time analytics transactions on the enterprise's data. The system does so without significantly hindering the performance of either transaction type and without having to move the data into a separate data warehouse. The writeable snapshots provide a consistent, point-in-time view of the data over which analysts can run complex, ad hoc queries. Moreover, the B-tree may be stored and manipulated in main memory, which allows the system to maintain good performance with a mix of random and streaming addresses.

Writeable snapshots may be useful in a number of scenarios. Writeable snapshots may be used to implement archiving of database state. Since a snapshot provides a consistent, point-in-time view of the data, the snapshot may be spooled to an archival store or across a wide area network to support data migration and disaster recovery. Writeable snapshots also may support active simulations.

Writeable snapshots also allow implementation of efficient and fine-grained continuous data protection (CDP). CDP systems capture and log incoming commands to a database management system (DBMS) and store the database state in a sophisticated storage array or filer that allows snapshotting of the store. In case of user error, application error, or data corruption, administrators may use CDP systems to roll-back to a previous state (snapshot) and move forward from the previous state with the errors removed. Traditional CDP systems are coarse grained and can only snapshot the state of the entire database. Moreover, some snapshots may be "heavy weight" operations, meaning they are time and resource intensive, so such snapshots may be executed infrequently. The herein disclosed writeable snapshots improve over these snapshots by allowing for snapshots of subsets of the database, such as a B-tree at a time, for example. Moreover, the writeable snapshots disclosed herein are held in memory. Thus, the writeable snapshots are "light weight" operations, thereby permitting more frequent snapshotting and more fine-grained control over roll-backs and recovery.

In summary, some use cases that the herein disclosed writeable snapshots support include: mixing transaction processing and analytics, archival, wide-area replication, and continuous data protection.

In addition to writeable snapshots, the herein disclosed systems and methods may provide copy-on-write methods that follow an optimistic concurrency control scheme, rather than a lock-coupling scheme, to maintain the multi-version B-tree. The optimistic concurrency control scheme supports versioning in a distributed, branching version B-tree.

Returning to FIG. 1, the architecture 10 provides a distributed data sharing service using a set of the memory nodes 16, and the transaction interface 20 that executes transactions on the data. Each node 16 provides an unstructured byte-addressable storage space. The transaction interface 20 provides fault-tolerant transactional access to this address space and is linked into the proxies 14. Clients 12 act on the shared B-tree states stored at nodes 16 by executing mini-transactions. A mini-transaction can read, compare, and conditionally update data at multiple memory locations, possibly at multiple nodes 16 running on different servers. The client 12 specifies the addresses of the memory locations ahead of time, and the updates are applied atomically only if all the comparisons (if any) evaluate positively.

Mini-transactions include reading a B-tree state from a memory node 16 during a B-tree traversal, as well as updating one or more B-tree nodes in order to perform a B-tree update or insertion operation. Note that the internal B-tree nodes visited during a traversal may be pulled from a cache at the proxy 14. The mini-transactions can be used to construct a more complex, dynamic transaction that can read and write objects (e.g., B-tree nodes) arbitrarily using optimistic concurrency. Each dynamic transaction maintains a read set and write set of objects it touches. A read operation on an object first tries to read the object locally from the write set or read set, and on failure it triggers a mini-transaction that fetches that object from a memory node 16 and adds it to the read set. Write operations place objects in the write set and defer updating the memory nodes 16 until the client 12 commits the entire dynamic transaction. Committing entails executing a mini-transaction that (1) validates the read set (i.e., verifies that the objects in the read set are identical to their "master copies" at nodes); and (2) if the validation succeeds, copies the objects in the write set to memory nodes 16. Validating the entire read set atomically with step (2) ensures that dynamic transactions are serializable. To reduce the CPU and network overhead due to validation, objects can be tagged with sequence numbers that increase monotonically on update, and comparisons can be based solely on the sequence numbers. Dynamic transactions can be used to transform any centralized data structure implementation into one that is distributed among multiple memory nodes 16 and can be accessed by many clients 12 in parallel.

Serializable transactions simplify the development of complex distributed transactions. However, they are also inherently expensive and can lead to poor performance, especially for workloads that include long-running transactions. An increasing number of organizations are recognizing the importance of real-time data analysis. The herein disclosed data management system addresses this challenge by executing long-running queries such as index scans against consistent snapshots of the data. Proxies 14 may create snapshots on demand, and may do so in such a way that queries are strictly serializable, meaning that the queries appear to act on the latest data. More precisely, strictly serializable queries (and other transactions) appear to execute in some serial order (as per serializability), and this order is consistent with a "happens before" relation of transactions (e.g., if transaction T1 ends before transaction T2 begins, then T2 does not appear to take effect before T1). Thus, snapshots can be used to capture the state of the B-tree for archiving and recovery, in addition to isolating analytics transactions from OLTP transactions.

Figure 2:
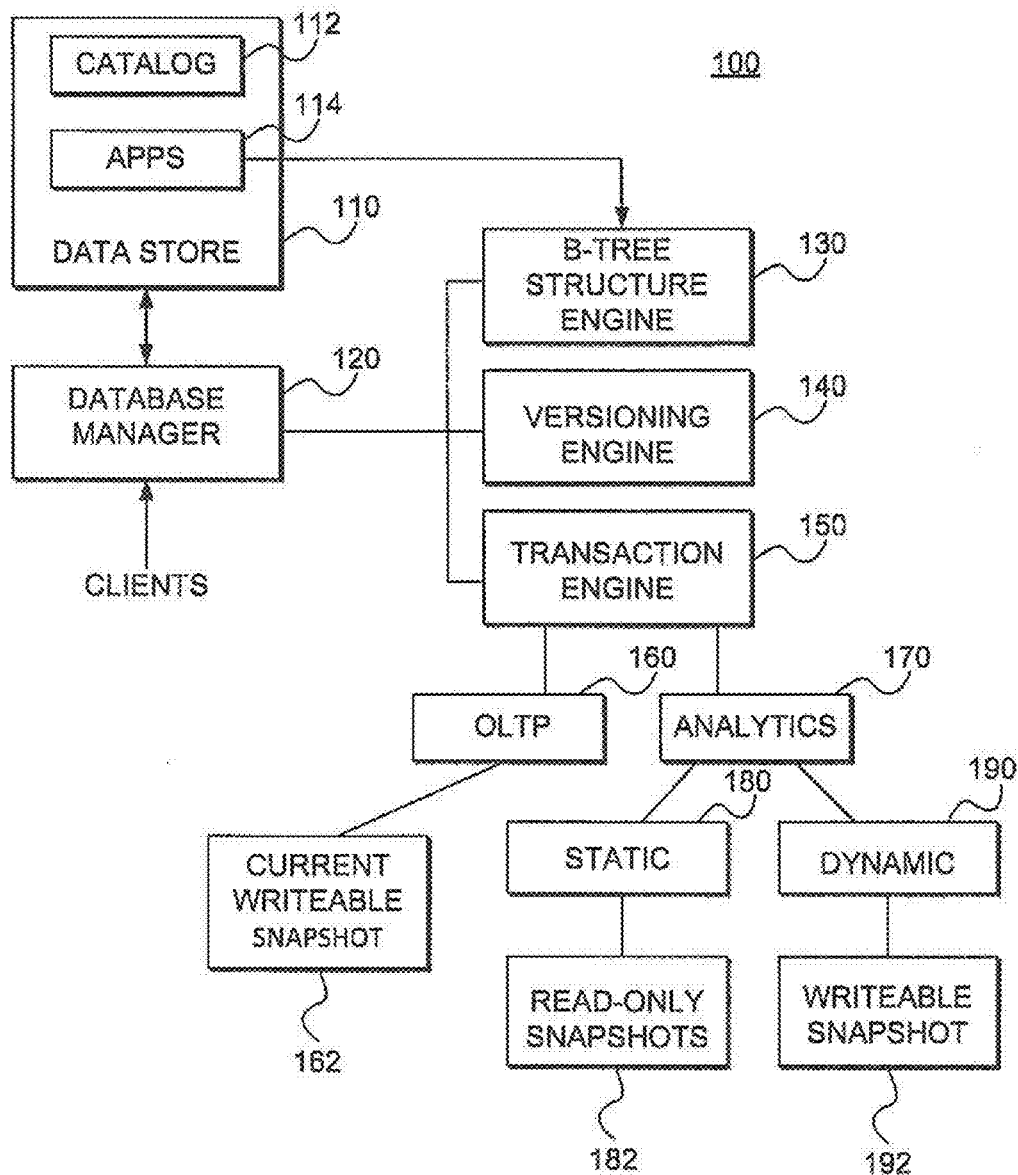
FIG. 2 is a block diagram of an example of a data management system that supports different transaction types.

FIG. 2 is a block diagram of an example of a data management system that supports multiple types of transactions. In FIG. 2, system 100 includes multi-version data store 110 coupled to data manager 120. The data store 110 may be distributed, and may include memory and data storage mediums. The data store 110 stores snapshot catalog 112 and B-tree applications 114. The data manager 120 may be a processor that executes machine instructions stored in the data store 110 to enable execution of the different transaction types mentioned above, at a number of distributed nodes, and to manage the data stored in the data store 110.

The data manager 120 is in communication with, and controls B-tree applications including B-tree structure engine 130, versioning engine 140, and transaction engine 150. The B-tree structure engine 130 implements a B-tree structure to order and control access to data in the data store 110. The versioning engine 140 controls versioning activities of the multi-version database stored in the data store 110 and the multi-version B-tree structure used to navigate the multi-version database. The transaction engine 150 provides clients 12 with the tools necessary to order transactions on the data stored in the multi-version database. For example, the transaction engine 150 provides an OLTP engine 160 that allows a client to request an OLTP transaction, and an analytics engine 170 that allows a client to order an analytics transaction. The OLTP engine 160 provides access, through current writeable snapshot engine 162, to a current view (e.g., a writeable snapshot) of the multi-version database. The analytics engine 170 provides access, through static engine 180, to a point-in-time view (i.e., read only snapshots) 182 of historical data stored in the multi-version database. The analytics engine 170 also provides, through dynamic engine 190, access to time-varying views (i.e., through writeable snapshots) 192 of the data in the multi-version database.

Since the data management system 100 stores data according to a distributed B-tree, copy-on-write techniques may be used to take consistent snapshots efficiently. When a new snapshot is created, every B-tree node is subsequently copied before being updated so that the snapshot is not overwritten. Each snapshot of the B-tree may be identified with a snapshot id that indicates the overall order in which the snapshots are created. A newly created snapshot may be writable, and all prior snapshots may be read-only.

Creating a snapshot begins with incrementing the snapshot id. The value before incrementing will be the id of the read-only snapshot, and a value one greater will be the new snapshot id. Note that every write and all up-to-date reads may be required to validate the snapshot id and root location. To avoid a contention hotspot and to ensure that most B-tree operations can commit at a single server, the data manager 120 replicates these id and root location values across all memory nodes 16. This replication process may increase the "cost" to update the snapshot id, as the data manager 120 must write to all memory nodes 16 atomically, which is a contention-prone operation. However, snapshot creation operations may be infrequent so that the benefit of efficient validation exceeds the additional update cost.

To support transactions that write to different snapshots, the database management system 100 provides a mechanism for identifying individual versions of the data and determining when one version is an ancestor of (i.e., is derived from) another version. In an embodiment, the mechanism is a snapshot id. Snapshot ids are unique integers assigned by the versioning engine 140, and parent-child relationships among versions are represented using pointers between the parent and child.

To support multiple snapshots, the database management system 100 includes the snapshot catalog 112 in memory of the data store 110. This catalog maps a composite key made up of a tree name and snapshot id to a pair of the form (Q, M) containing a memory reference Q and a replacement number M. The replacement number M may indicate a number of times the node has been updated. In this example, the replacement number is a snapshot id. For a given snapshot, this pair contains the location of the root of the given snapshot and the id of the first snapshot created from the given snapshot, or a special nil value if no such snapshot has been created. For concreteness this nil value is denoted by 0. If the replacement number is 0 (e.g., in the pair (1, 0)), then the snapshot may be writeable; otherwise, the snapshot may be treated as read-only. Note that for a read-only snapshot, the replacement number M may be 1 greater than the snapshot id to which the replacement number M refers.

The catalog 112 may be stored using a separate B-tree without snapshot support, which ensures the catalog 112 is durable and always available. The B-tree that stores the catalog 112 may replicate the leaf nodes across all memnodes 16, and may cache the leaf nodes with the proxies 14.

The versioning engine 140 may record in the catalog 112 the "current snapshot id", corresponding to the most-recent "mainline" version of each B-tree. Most transactions in the system 100 will run against this version of the B-tree, so the versioning engine 140 may replicate the id to speed-up validation in this common case. Each B-tree node also may be tagged with and identified by a pair of snapshot ids reflecting the node's last update. For example, when a new node is created, that new node may be assigned a node snapshot id (nsid) and a copy snapshot id (csid) to distinguish them from the global snapshot id (gsid), which applies to the overall B-tree, and a transaction snapshot id (tsid), which applies to a transaction executable on the B-tree, and which corresponds to a snapshot to which the transaction applies. Thus, a node identification may include both a nsid and a csid. The nsid of the new node corresponds to the tsid of the transaction that created the new node, and the csid is the nsid of the first copy made of the node. If a copy of the new node has not been made, the csid may be undefined or assigned a null value.

When a new snapshot is created, the new snapshot shares each B-tree node with earlier read-only snapshots until the B-tree node is overwritten, which may happen by way of a B-tree split or a copy-on-write, in the new snapshot. As noted above, each B-tree node is annotated with the snapshot id at which it was created (i.e., the nsid), and the snapshot id of the first copy of the new node (i.e., the csid), and to keep track of the snapshots, the snapshot id and a location of the corresponding root node are stored in the snapshot catalog 112. Reads can be performed against any snapshot, although the client 12 may be responsible for keeping track of the location of the root node for read-only snapshots. When a B-tree node is updated at snapshot k, for example, the versioning engine 140 first compares k with the snapshot id (i.e., compared with the nsid) stored in the node. If k is larger than the nsid value, the versioning engine 140 copies the node and updates the copy, assigning the new node snapshot id k. The versioning engine 140 then adjusts the parent of the old node so that the old node parent points to the new node. This update also is performed at snapshot k, which may force another copy. In general, an update to a leaf node may require copying all nodes on the path from the root to the leaf.

Figure 3:
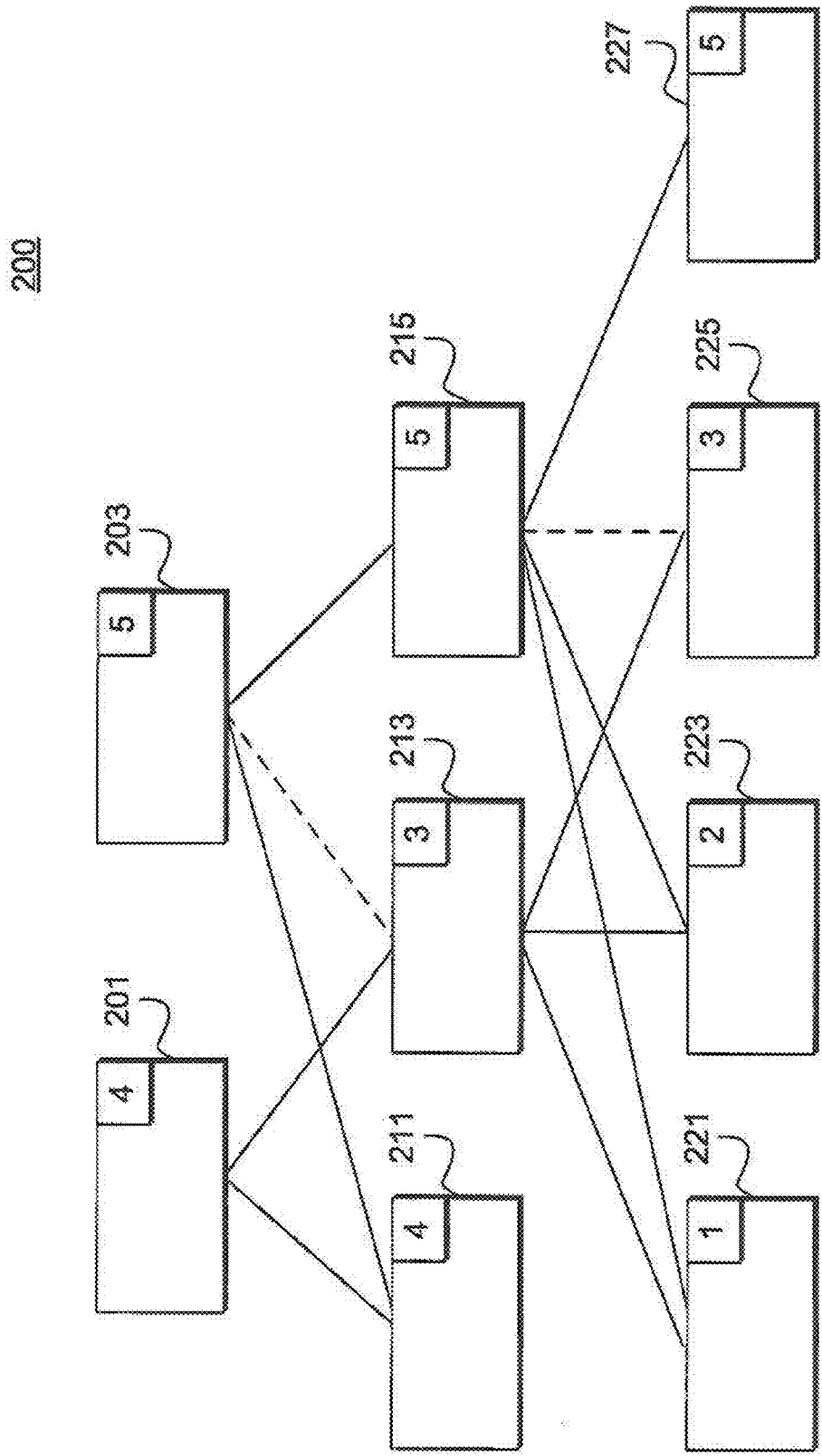
FIG. 3 illustrates an example of a copy-on-write operation in a B-tree structure as executed by the system of FIG. 2.

FIG. 3 illustrates the copy-on-write procedure. In FIG. 3, B-tree 200 includes root nodes 201 and 203, intermediate nodes 211, 213, and 215, and leaf nodes 221, 223, 225, and 227. Each node is shown with its snapshot id, and the leaf node 225 is being updated at snapshot 5. Since the leaf node 225 was created at snapshot 3, the leaf node 225 may be copied to a new node 227. Similarly the parent node 213 may be copied (to 215) before its child pointer is updated. The child pointer in the root 201 also may be updated, but since the root node 203 already is at snapshot 5, the root node 203 does not need to be copied. The old child pointers are shown as dashed lines.

The copy-on-write procedure of FIG. 3 may be implemented using dynamic transactions. Dynamic transactions maintain a read set and a write set of the objects the transactions touch. A read transaction first tries to read an object locally from the read or write set, or from a local cache, and on failure, triggers a mini-transaction that fetches the object from a memory node 16 and adds the object to the read set. The entire read set then is validated atomically, which ensures the dynamic transactions are serializable.

Figure 4A:
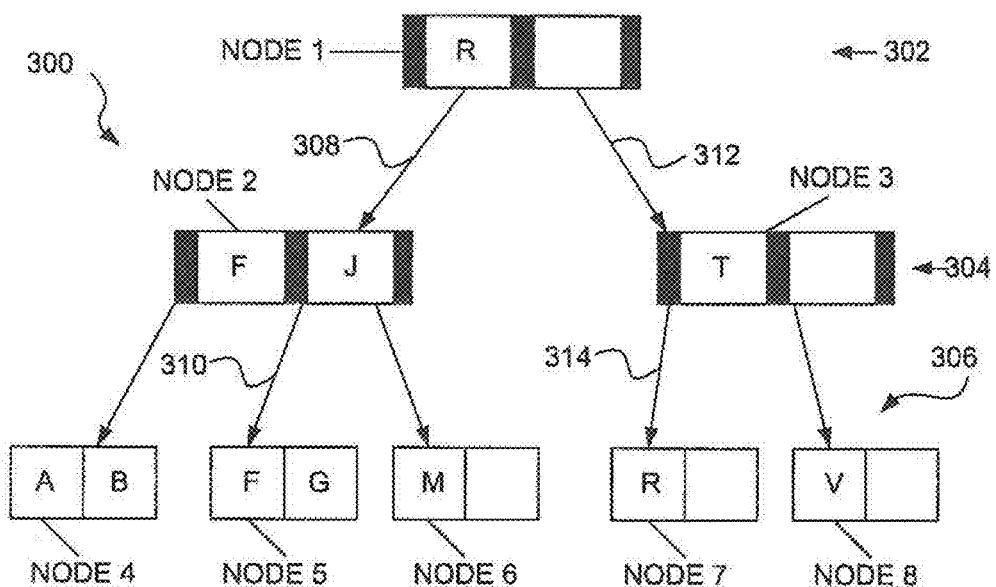
FIGS. 4A and 4B illustrate an example of concurrency control as implemented in the system of FIG. 2.

To perform an up-to-date read or write, a proxy 14 adds its cached copy of the latest snapshot id and corresponding root location to the transaction's read set. Then, if another transaction attempts to create a new tip snapshot concurrently, the associated validation will fail, and the transaction will abort (but may be tried). By contrast, when a proxy 14 reads from a read-only snapshot (i.e., a snapshot earlier than the tip snapshot), the transaction can abort only if the proxy's cache contained a stale copy of the B-tree node corresponding to the read-only snapshot. This can happen if a proxy 14 cached a B-tree inner node before another proxy 14 modified the node and then took a snapshot. These and similar situations imply that a multi-version B-tree is subject to concurrency issues, To address concurrency in a multi-version B-tree, the database management system 100 includes concurrency control mechanisms. For example, the system 100 may encounter difficulties when two operations are executed concurrently or simultaneously on a path of the B-tree, and one of the operations modifies a node in the path. A first concurrency problem may arise in implementations of a B-tree client that validates the entire path from root to leaf optimistically; for example a modification operation of a node on the path can cause a concurrently executed lookup operation to fail. This B-tree concurrency issue is described with reference to FIGS. 4A and 4B. FIG. 4A shows an example B-tree 300. The B-tree 300 includes a root node (node 1) at level 302, and leaf nodes (nodes 4-8) at level 306. The leaf nodes store respective pairs of keys and associated values. For ease of illustration, FIG. 4A does not show the values associated with the keys. Intermediate level 304 includes intermediate nodes (2, 3) between the root node and the leaf nodes.

Each level holds several keys in increasing order (from left to right in FIG. 4A), and has pointers (except at the lowest level 306 corresponding to the leaf nodes) to the next level. To look up a key, for example key G in FIG. 4A, which can be specified in a search request, the look up transaction starts at the root node 1 and follows the leftmost edge 308 from the root node since G<R and R is the leftmost key at the root node. The edge traversed by the look up transaction is based on a comparison of the key G and keys stored in node 1 (in this case key R). The appropriate pointer stored in node 1 then is used to traverse to the next lower level of the B-tree 300. In this example, the pointer points to the leftmost edge 308 to cause the transaction to traverse to node 2. The transaction then follows the middle edge 310 from node 2, since G is between F and J (the keys stored in node 2). The transaction finally arrives at the node 5, where the key G is found.

Figure 4B:
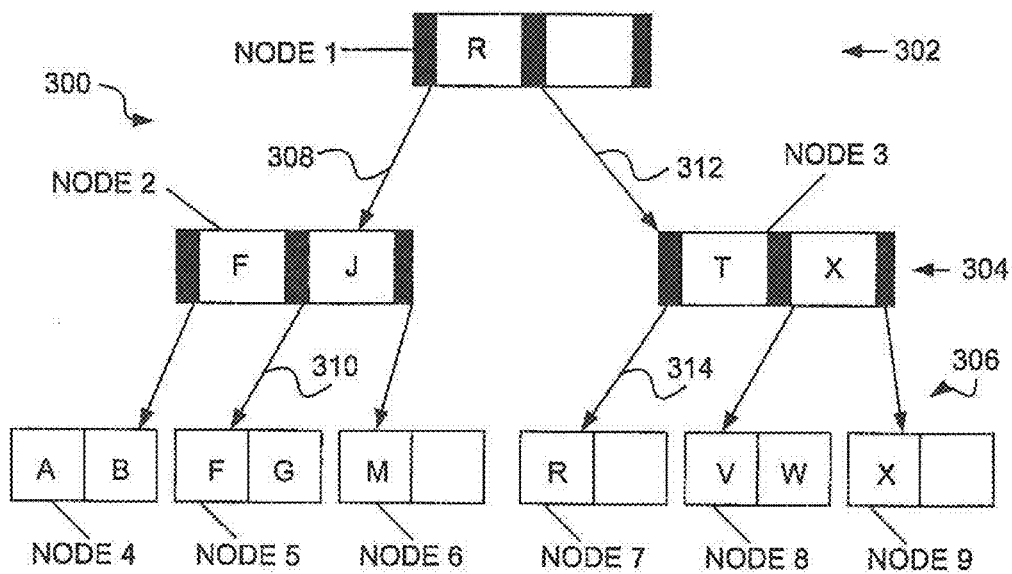

Concurrently with this lookup operation, a client 12 may have initiated an insert operation to insert key W. By following the procedure to look up W, the operation arrives at leaf node 8. However, there is no room to insert key W into node 8 since all slots in node 8 are already occupied (with keys V and X). As a result, node 8 has to be split into two nodes (node 8 and new node 9, as illustrated in FIG. 4B). Also, the parent node 3 is modified by adding the key X and a pointer to the new node 9 (see FIG. 4B).

Referring now to FIG. 4B, if a first transaction (T1) looks up R concurrently with a second transaction (T2) which inserts key W, then the following may occur: T2 visits nodes 1, 3 and 8, sees that node 8 is full, and is about to split node 8. T1 visits nodes 1 and 3, and is about to perform a final step in which it fetches 7 and validates 1 and 3. At this point T2 performs its final step—it validates nodes 1, 3, and 8, splits node 8, creates node 9 and updates node 3. Finally T1 performs its final step—it attempts to validate 1 and 3, and fetch 7. The validation by T1 fails because T2 has changed node 3. Thus T2 causes T1 to abort, even though T1 correctly reaches node 7 and finds key R.

To ensure that a client reaches the correct leaf node without validating the entire path, the nodes of the B-tree 300 may include a pair of fence keys that indicate the range of key values supported and/or reachable by the node. For example, without the fence keys, a lookup for key X that is concurrent with T2 in the above example may mistakenly land on node 8 in FIG. 4B instead of node 9, and conclude erroneously that X is not in the tree. To avoid this error, at each point in the traversal, the transaction engine 150 compares the fence keys at the node visited against the search key. If the search key is outside the key range indicated by the fence keys, the versioning engine 140 may, for example, continue the traversal at the appropriate sibling B-tree node, or abort the operation and validate all the nodes visited during the traversal.

A second concurrency problem may arise because of the multi-version nature of the database and the associated B-tree where snapshots are taken to capture versions of the data. With this concurrency problem, a traversal ends up at the correct leaf node in the wrong snapshot.

Referring back to FIG. 3, if the copy-on-write is performed concurrently with a search terminating at node 225, it is possible that the search would see the old snapshot of the internal node 213 rather than the new node 215. If the copy-on-write commits before the search reaches the leaf level, then it is possible that the leaf node 225 will validate successfully, even though it has an incorrect snapshot id. Fence keys are not sufficient to solve this problem, because the leaf node 225 may cover the correct key range but in a stale snapshot. To address this problem, the versioning engine 140 stores one additional piece of state in each B-tree node: the snapshot id for which the node has been copied, if any. For instance, in FIG. 3, the versioning engine 140 would store 5 in both of the nodes that were copied (in addition to the snapshot id for which each node was created), because their copies have snapshot id 5.

Note that the snapshot id is well defined, because each node can be copied at most once. During a read or write at snapshot k, if the search encounters a node that has been copied to a snapshot id less than or equal to k, then the search aborts because the traversal should visit the copy (or a copy of the copy, etc.) instead. Otherwise, if the node has the appropriate fence keys, then it is guaranteed to be on the correct traversal path. Note that while this procedure guarantees correctness, it can lead to performance problems when implemented naively. In particular, if the versioning engine 140 increments the sequence number of a node when the node is copied to a new snapshot, then operations on old snapshots may fail to validate and abort unnecessarily. To avoid this, the versioning engine never validates B-tree nodes read during operations on read-only snapshots (e.g., scans). Leaf nodes are read directly from the memory nodes, which alone guarantees the leaf nodes are valid, and fence keys are used to detect inconsistencies that may arise when the B-tree traversal uses stale copies of internal nodes. This ensures that long-running operations (e.g., analytics transactions) on read-only snapshots will not be aborted due to updates to the new snapshot of the B-tree.

Creating sequential read-only snapshots is useful for many analytics transactions, but for more complex and lengthy analytics transactions, an analyst may prefer to work directly with a parallel version of the data, rather than a mainline version. For example, an analyst working on a predictive model might wish to validate a hypothesis by experimenting with slightly modified data. While the analyst could export the data and modify the data separately, there are advantages to instead creating a branch within the same system. First, if only a small fraction of the data is changed, it may be much more efficient, in both time and space, to use a copy-on-write approach rather than exporting the entire data set. Maintaining several versions in the same system also allows the analyst to issue transactional queries across different versions of the data, which may be useful for integrity checks and to compare the results of an analysis.

Figure 5:
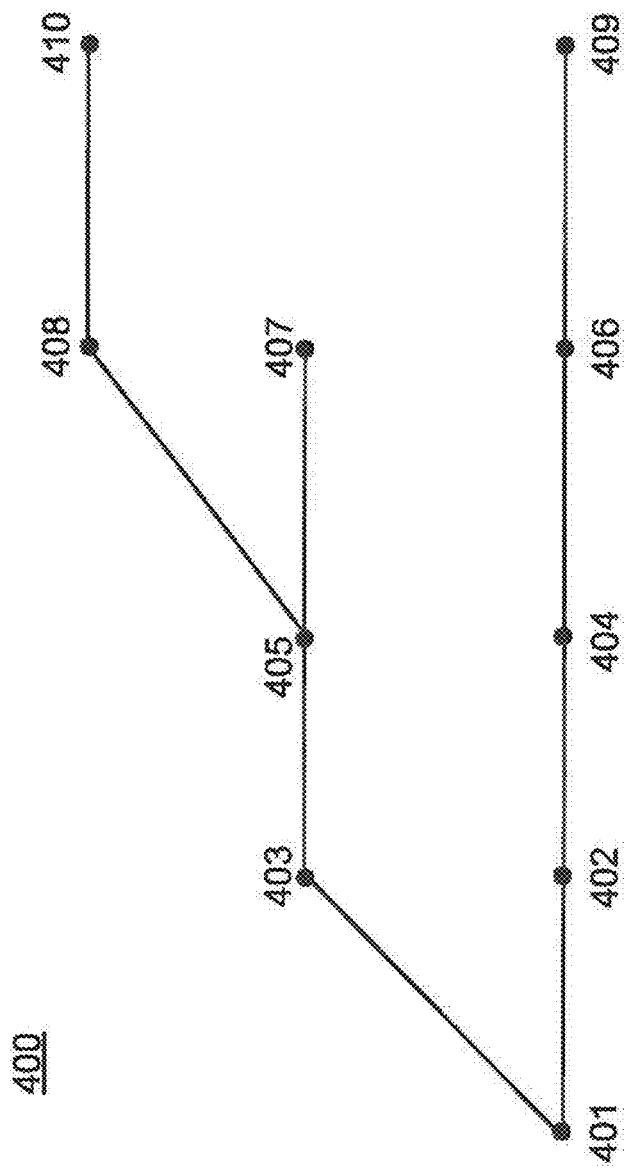
FIG. 5 illustrates an example of branching as implemented in the system of FIG. 2.

A modified version of the previously disclosed copy-on-write process may be used to support branching. Specifically, in addition to creating snapshots with monotonically increasing ids, the database manager 120 may create a branch from an existing read-only snapshot. This branching process may be illustrated in a (logical) B-tree version 400 of the (physical) B-tree, as shown in FIG. 5. In effect, the logical B-tree version 400 of the physical B-tree shows the B-tree snapshot history. The internal nodes of this logical B-tree 400 correspond to read-only snapshots of the physical B-tree, while the end or tip nodes of the logical B-tree 400 correspond to writable snapshots of the physical B-tree. Thus in FIG. 5, clients 12 may write to snapshots 407, 409, and 410, while the other snapshots are read-only. If a client 12 wants to write to one of the read-only snapshots, the client 12 may request that a branch be created at the read-only snapshot. For example, when snapshot 407, which is a writeable snapshot, was created, snapshot 405 was made read-only. Then, to write to snapshot 405, a branch with snapshot 408 was created. Creating a new branch creates, in the logical B-tree 400, a new tip to which new updates may be applied. That is, the newly created snapshot in the branch is a writeable snapshot. Note that when branches are created, it may no longer be possible to use consecutive sequence numbers, as can be seen in FIG. 5.

Thus, because the branching process means there no longer is a natural overall order to the snapshots, the assignment of ids to snapshots may change; however, the versioning engine 140 still assigns snapshot ids using a monotonically increasing integer. Furthermore, since there no longer is a unique writable snapshot, the way the system 100 performs up-to-date reads and writes may be changed. For instance, if a client 12 has read data at snapshot 405 in the version tree from FIG. 5, the "correct" snapshot might be either 407 or 410.

By default, the versioning engine 140 (see FIG. 2) follows the branch created first (i.e. the one with the lowest snapshot id) when retrying a dynamic transaction, but the user may explicitly specify an alternative. Thus, in the example of FIG. 5, the versioning engine 140 first would follow the branch to snapshot 407. This process defines a mainline of snapshot ids in the logical B-tree 400 that starts at the root and ends at the snapshot used for up-to-date operations.

To keep track of the logical B-tree 400, the database manager 120 stores metadata about each snapshot in the snapshot catalog 112. Thus, the snapshot catalog 112 includes the id of each snapshot, the location of the root node, and the first branch created from the snapshot (if any), which may be referred to as the branch id of the snapshot. When the branch id is NULL, no branches have been created from the snapshot, and the snapshot is writable.

B-tree operations involving branching, such as would occur with the logical B-tree 400 of FIG. 5, may be similar to the previously disclosed herein. For example, up-to-date reads and writes may validate the branch id of the desired snapshot and retry if the validation fails (i.e. if the branch id becomes non-null). B-tree nodes are copied before they are updated, and the versioning engine 140 assigns the copy the snapshot id at which the write occurs.

To create a new snapshot, the versioning engine 140 increments the global snapshot id and creates a new entry with this id in the snapshot catalog 112. The versioning engine 140 also allocates a root node to anchor the new snapshot, and updates the branch id of the snapshot from which the new snapshot was created. Thus, creating a new branch is identical to creating a new snapshot. That is, creating a new snapshot creates the first branch from an existing snapshot, and additional branches are created in the same way, except that the branch id does not change.

Figure 6:
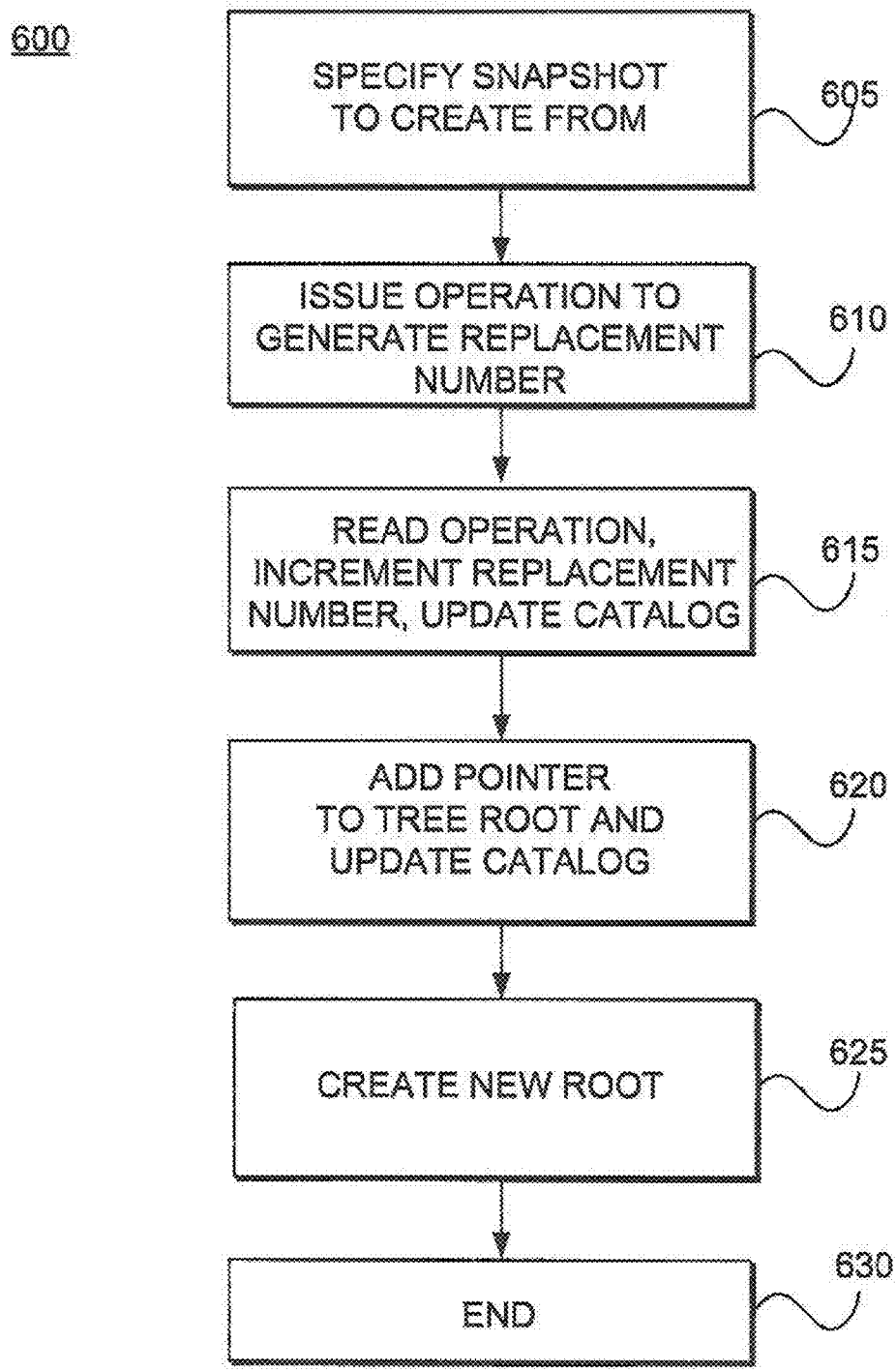
FIGS. 6-8 are flowcharts illustrating examples of methods executed in the system of FIG. 2.
Figure 8:
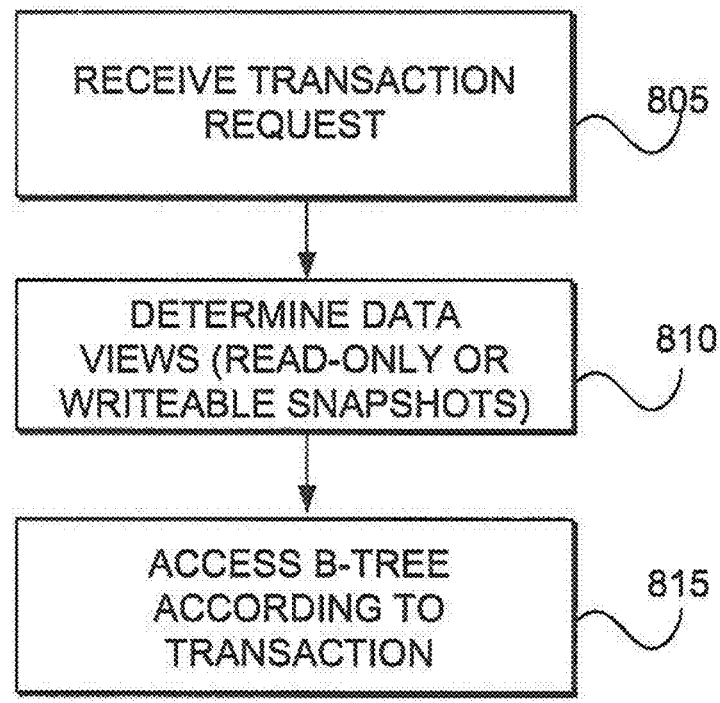

FIGS. 6-8 are flowcharts illustrating example methods of the database management system 100 of FIG. 2. FIG. 6 illustrates a create snapshot method for a mainline B-tree using the system 100. In FIG. 6, method 600 begins in block 605 when a client 12 specifies an existing snapshot. In block 610, the client 12 then issues a transaction to increment the replacement number of the snapshot and to insert a new entry into the snapshot catalog. In block 615, the versioning engine 140 reads the transaction, increments the replacement number, and inserts the new entry in the snapshot catalog. The updated snapshot now is read-only, and the new snapshot is writeable. In block 620, the versioning engine 140 adds a pointer to the previous (parent's) tree root. In block 625, the database manager 120 creates a new root at the next update of the newly created snapshot. In block 630, method 600 ends. Note that the method 600 describes a single atomic transaction; either all of method 600 is executed, or none of method 600 is executed. Method 700 also describes a single atomic transaction.

FIG. 7 is a flowchart illustrating an example insert/update method executed on the system 100 of FIG. 2. In FIG. 7, method 700 begins in block 705 when a client 12 requests an update transaction to a node of a B-tree. In block 710, the versioning engine 140 compares the transaction snapshot id (tsid) of the update transaction to the node snapshot id (nsid) of the node to be updated and to the csid of the node to be updated. As noted above, the nsid is the id at which the node was created and the csid is the id to which the node was copied on write. In block 715, the versioning engine 140 determines if the tsid is less than, greater than, or equal to the nsid. If the tsid is less than the nsid, the transaction is aborted, block 720. If the tsid and the nsid are equal, the versioning engine 140 updates the node, block 725. If the tsid is greater than the nsid, method 700 moves to block 730. In block 730, the versioning engine 140 determines if the tsid is less than the csid. In block 730, if the tsid is greater than or equal to the csid, the method moves to block 720, and the transaction aborts. However, if the tsid is less than the csid, the method 700 moves to block 735. In block 735, the versioning engine 140 copies the node and updates the copy. The method 700 then moves to block 740.

In block 740, the versioning engine 140 increments the sequence number of the original node, copies the incremented sequence number into the copy, and ensures that the nsid of the copy becomes the tsid and the csid of the original node also becomes the tsid. The versioning engine 140 records the nsid and csid and copy sequence numbers and records the tsid as the nsid of the copy and the cisd of the copy. In block 745, the versioning engine 140 updates the parent node to point to the copy. In block 750, the versioning engine 140 determines if the root node was copied. If the root node was copied, the method 700 moves to block 755, and the versioning engine 140 updates the snapshot catalog 112. Following block 755, or if the root node was not copied, the method 700 moves to block 760 and ends.

FIG. 8 is a flowchart illustrating an example method for executing transactions using a multi-versioned B-tree. In FIG. 8, method 800 begins in block 805 when a client 12 requests execution of a transaction and specifies a transaction type. Transaction types may be OLTP transactions and analytic transactions. In block 810, the transaction engine 150 determines a view of the data according to the specified transaction type. Views of the data may be from a current (writeable) snapshot of the B-tree, or from one or more read-only snapshots. In block 815, the client 12, using the transaction engine 150 accesses the B-tree and the associated data in the multi-versioned database.

We claim:

1. A method for managing data using writeable snapshots in a multi-versioned, distributed B-tree comprising nodes distributed over a plurality of servers, comprising:
    receiving a transaction request specifying a transaction type, the transaction having a transaction snapshot id, wherein the transaction snapshot id comprises an identification of a snapshot the transaction applies to; and
    determining the transaction type, wherein:
    the transaction type is an update transaction:
        determining a node to update, wherein the node comprises a node snapshot id and a copy snapshot id, wherein the node snapshot id comprises a snapshot id at which the node was created and the copy snapshot id comprises a snapshot id of the first copy of the node, and
        if the transaction snapshot id is greater than or equal to the node snapshot id and less than the copy snapshot id:
            copying the node and updating the copy to create a writeable snapshot, wherein a snapshot comprises a point-in-time view of data and the node includes a read only snapshot;
            assigning the transaction snapshot id as a node snapshot id of the copy;
            incrementing sequence numbers of the node and the copy; and
            placing a pointer from the node to the copy.

2. The method of claim 1, wherein the node to be copied becomes a vertex, of a branch of a logical structure corresponding to a snapshot history of the B-tree and wherein the copy becomes a tip of the branch.

3. The method of claim 2, wherein the node to be copied comprises a read only snapshot.

4. The method of claim 1, wherein the transaction is a read transaction on an existing snapshot of the B-tree, the method further comprising:
    determining a root location for the snapshot; and
    traversing the B-tree from the root location.

5. The method of claim 1, wherein the transaction snapshot id equals the node snapshot id, the method further comprising updating the node.

6. The method of claim 4, wherein the transaction snapshot id is less than the node snapshot id, the method further comprising aborting the transaction.

7. A non-transitory computer readable storage medium encoded with a computer program, the program comprising instructions for managing data and transactions in a multi-version database accessed by a multi-version B-tree, the instructions, when executed by a processor, causes the processor to:
    create an initial version of a B-tree structure for accessing the database, a version of the B-tree structure identified by a global snapshot id;
    receive a request to update data in the database;
    increment the global snapshot id;
    create an initial snapshot of the initial B-tree structure, wherein a snapshot comprises a point-in-time view of data of the initial B-tree structure;
    traverse the initial B-tree structure from a root node to intermediate nodes to locate a node to update and update the located node, wherein the processor:

creates a new snapshot from the initial snapshot, wherein the new snapshot is writeable;

makes the initial snapshot a read only snapshot;

writes the data at the located node, updates a sequence number of the located node, wherein the sequence number comprises an increment from the sequence number of the located node prior to writing data, sets child pointers from the traversed intermediate nodes and the root node to point to the located node, and records the updated sequence number, the incremented global snapshot id, and the child pointers.

8. The computer readable medium of claim 7, wherein the initial snapshot comprises a snapshot identification.

9. The computer readable medium of claim 8, wherein the processor further:

increments a snapshot identification of the initial snapshot; and stores the initial snapshot and the new snapshot in a snapshot catalog, wherein the new snapshot is writeable.

10. The computer readable medium of claim 9, wherein the incremented snapshot identification points to a root node of the new snapshot.

11. A method for managing data defined by a multi-version, distributed B-tree, the B-tree comprising a plurality of nodes distributed among a plurality of servers, the method comprising:

receiving a transaction to execute on a node of the distributed B-tree;

comparing an identification of the transaction with an identification of the node on which the transaction is to be executed, wherein the identification of the node corn rises a node snapshot id and a copy snapshot id of the node, and wherein the identification of the transaction comprises an identification of a snapshot the transaction applies to, the node snapshot id comprises a snapshot id at which the node was created, and the copy snapshot id comprises a snapshot id of the first copy of the node; and based on the comparison, completing one of:

aborting the transaction in response to at least one of the identification of the transaction being less than the node snapshot id and the identification of the transaction being greater than or equal to the copy snapshot id of the node, updating the node in response to at least one of the identification of the transaction being equal to the node snapshot id of the node and the identification of the transaction being less than the copy snapshot id of the node, wherein updating the node comprises:

copying the node and updating the copy to create a writeable snapshot, wherein a snapshot comprises a point-in-time view of data and the node includes a read only snapshot;

assigning the transaction snapshot id as a node snapshot id of the copy;

incrementing sequence numbers of the node and the copy; and placing a pointer from the node to the copy; and executing the transaction, wherein if the transaction is executed, updating a version of the node.

12. The method of claim 11, wherein the transaction is an update transaction, and wherein the comparison determines if the identification of the transaction is one of equal to the node identification, greater than the node identification, and less than the node identification.

13. The method of claim 12, wherein placing the pointer from the node to the copy comprises adding a pointer to a parent of the node, the pointer pointing to the copy node.

14. The method of claim 13, further comprising:

copying a root node of the B-tree; and updating a snapshot of the B-tree in a snapshot catalog with a sequence number of the snapshot and a location of the root.

15. The method of claim 14, further comprising saving the snapshot as a writeable snapshot.

* * * * *